US011313959B2

(12) United States Patent
Salazar Aquino et al.

(10) Patent No.: US 11,313,959 B2
(45) Date of Patent: Apr. 26, 2022

(54) METHODS AND APPARATUS FOR BLIND RANGE RECOVERY ON PULSE COMPRESSION RADARS

(71) Applicant: The Board of Regents of the University of Oklahoma, Norman, OK (US)

(72) Inventors: Cesar M. Salazar Aquino, Norman, OK (US); Robert D. Palmer, Norman, OK (US); Boon Leng Cheong, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 16/765,429

(22) PCT Filed: Jan. 29, 2020

(86) PCT No.: PCT/US2020/015697
§ 371 (c)(1),
(2) Date: May 19, 2020

(87) PCT Pub. No.: WO2020/160160
PCT Pub. Date: Aug. 6, 2020

(65) Prior Publication Data
US 2021/0231787 A1    Jul. 29, 2021

Related U.S. Application Data

(60) Provisional application No. 62/798,287, filed on Jan. 29, 2019.

(51) Int. Cl.
*G01S 13/28* (2006.01)
*G01S 7/288* (2006.01)
*G01S 7/282* (2006.01)

(52) U.S. Cl.
CPC .............. *G01S 13/28* (2013.01); *G01S 7/282* (2013.01); *G01S 7/2886* (2021.05)

(58) Field of Classification Search
CPC ........ G01S 13/28; G01S 7/2886; G01S 7/282; G01S 7/28
(Continued)

(56) References Cited

U.S. PATENT DOCUMENTS 5,036,324 A * 7/1991 Lamper .................. G01S 13/284
342/132
6,078,281 A * 6/2000 Milkovich ............ G01S 7/2926
342/162

(Continued)

FOREIGN PATENT DOCUMENTS

CN    103064065 A  *  4/2013  ............... G01S 7/02
CN    103064068 A  *  4/2013  ............... G01S 7/28
(Continued)

OTHER PUBLICATIONS

Bharadwaj et al., "Wideband Waveform Design Principles for Solid-State Weather Radars", Journal of Atmospheric and Oceanic Technology, vol. 29, American Meteorological Society, Jan. 2012.

(Continued)

*Primary Examiner* — Olumide Ajibade Akonai
*Assistant Examiner* — Alexander L. Syrkin
(74) *Attorney, Agent, or Firm* — Dunlap Codding, P.C.

(57) ABSTRACT

Methods, systems and non-transitory computer readable mediums for processing radar signals to recover signals inside a blind region are disclosed. A transmission signal is transmitted from a radar system. The radar system receives a return signal. The return signal includes a first portion of the transmission signal leaked during transmission and a second portion reflected from an object within the blind region. The return signal is partially decoded by zeroing out (Continued)

the first portion of the transmission signal to form a modified return signal. Pulse compression is performed over the modified return signal to form a compressed return signal. The compressed return signal is processed to calculate moment products. The moment products are calibrated with a calibration factor, wherein the calibration factor is multiplied against only calculated moment products of range gates which have been partially decoded.

16 Claims, 14 Drawing Sheets

(58) Field of Classification Search
USPC .......................................................... 342/201
See application file for complete search history.

(56) References Cited

U.S. PATENT DOCUMENTS

| | | | | |
|---|---|---|---|---|
| 6,232,913 | B1* | 5/2001 | Lehtinen | G01S 7/295 342/104 |
| 6,825,800 | B1* | 11/2004 | Dudley | G01S 7/282 342/194 |
| 2005/0190100 | A1* | 9/2005 | Hester | G01S 7/4004 342/174 |
| 2013/0141270 | A1* | 6/2013 | Rodenbeck | G01S 13/0209 342/137 |
| 2013/0278455 | A1 | 10/2013 | Song | |
| 2014/0292563 | A1 | 10/2014 | Palmer et al. | |
| 2017/0322297 | A1* | 11/2017 | Dai | G01S 13/12 |

FOREIGN PATENT DOCUMENTS

| | | | | |
|---|---|---|---|---|
| CN | 104316917 A | * | 1/2015 | ............. G01S 13/02 |
| CN | 207817193 U | * | 9/2018 | ............... G01S 7/02 |
| EP | 2927706 A1 | * | 10/2015 | ............. G01S 13/34 |
| FR | 2422176 A1 | * | 11/1979 | ........... G01S 13/288 |
| JP | 2019219314 A | * | 12/2019 | |
| RU | 2221258 C1 | * | 1/2004 | |
| WO | WO-2007046082 A1 | * | 4/2007 | ......... G01S 13/5246 |

OTHER PUBLICATIONS

Cheong et al., "PX-1000: A Solid-State Polarimetric X-Band Weather Radar and Time-Frequency Mulitplexed Waveform for Blind Range Mitigation", IEEE Transactions on Instrumentation and Measurement, vol. 62, No. 11, Nov. 2013.

Lewis et al., "Linear Frequency Modulation Derived Polyphase Pulse Compression Codes", IEEE Transactions on Aerospace and Electronic Systems, vol. AES-18, No. 5, Sep. 1982.

PCT International Search Report and Written Opinion regarding PCT App. No. PCT/US20/15697, dated Apr. 23, 2020.

* cited by examiner

METHODS AND APPARATUS FOR BLIND RANGE RECOVERY ON PULSE COMPRESSION RADARS

CROSS-REFERENCE TO RELATED APPLICATIONS

The present patent application claims priority to the Patent Cooperation Treaty patent application identified by PCT/US2020/015697, filed on Jan. 29, 2020, which claims priority to the provisional patent application filed on Jan. 29, 2019, and identified by U.S. Ser. No. 62/798,287, the entire content of which is hereby incorporated herein by reference.

BACKGROUND

In general, solid-state radars require the use of long transmit waveforms in order to regain the sensitivity loss due to the low peak transmit power of solid-state transmitters. Pulse compression techniques are usually used alongside to recover the range resolution. The downside of using a long transmit pulse is that it results in a so-called blind region at close range, wherein the first part of the data collection is blind due to the strong leak-through transmit signal within the radar system. This is an inherent problem when pulse compression waveforms are implemented in radar.

Existing techniques to mitigate the blind region use either a time-delayed or a frequency-shifted short pulse after the long pulse in order to fill in the missing data. One such existing technique uses multiple transmit frequency bands (N. Bharadwaj, and V. Chandrasekar, "Wideband Waveform Design Principles for Solid-State Weather Radars", J. Atmos. Oceanic Technol., 29(1), pp 14-31, 2012). The technique achieved blind range filling by using a collection of wideband waveforms that are concatenated together. This technique, of course, requires more frequency spectrum and was demonstrated using a wideband experimental X-band radar (WiBEX). A second similar technique uses a closely spaced frequency separation, referred to as the time-frequency multiplexed (TFM) waveform, presented in (B. L. Cheong, K. Redmond, R. D. Palmer, Y. Zhang, M. Yeary and T.-Y. Yu, "PX-1000: A Solid-State Polarimetric X-Band Weather Rada r and Time-Frequency Multiplexed Waveform for Blind Range Mitigation," IEEE Trans. Instrum. Meas., 62(11), pp 3064-3072, 2013). The technique uses a short pulse at a slightly different frequency than the long transmit waveform and was demonstrated through a commercial off-the-shelf digital transceiver (Pentek). In this method, the radar hardware treats everything as a single waveform. The signal processing method demultiplexes the return signals into two streams of raw data for long and short ranges. FIG. 1 shows an example reflectivity image with blind range filling using a Time-Frequency Multiplexed (TFM) waveform. Note that the abrupt transition in radar sensitivity near the city of Moore, which indicates the blind range of the waveform. However, these solutions are suboptimal since they require transmitting more than one tone, i.e., higher frequency bandwidth usage, adding to the expense of the operation.

Therefore, a need exists for an approach that does not rely on the use of fill pulses.

BRIEF DESCRIPTION OF THE DRAWINGS

Several embodiments of the present disclosure are hereby illustrated in the appended drawings. It is to be noted however, that the appended drawings only illustrate several typical embodiments and are therefore not intended to be considered limiting of the scope of the present disclosure. Further, in the appended drawings, like or identical reference numerals or letters may be used to identify common or similar elements and not all such elements may be so numbered. The figures are not necessarily to scale and certain features and certain views of the figures may be shown as exaggerated in scale or in schematic in the interest of clarity and conciseness.

DETAILED DESCRIPTION

Figure 1:
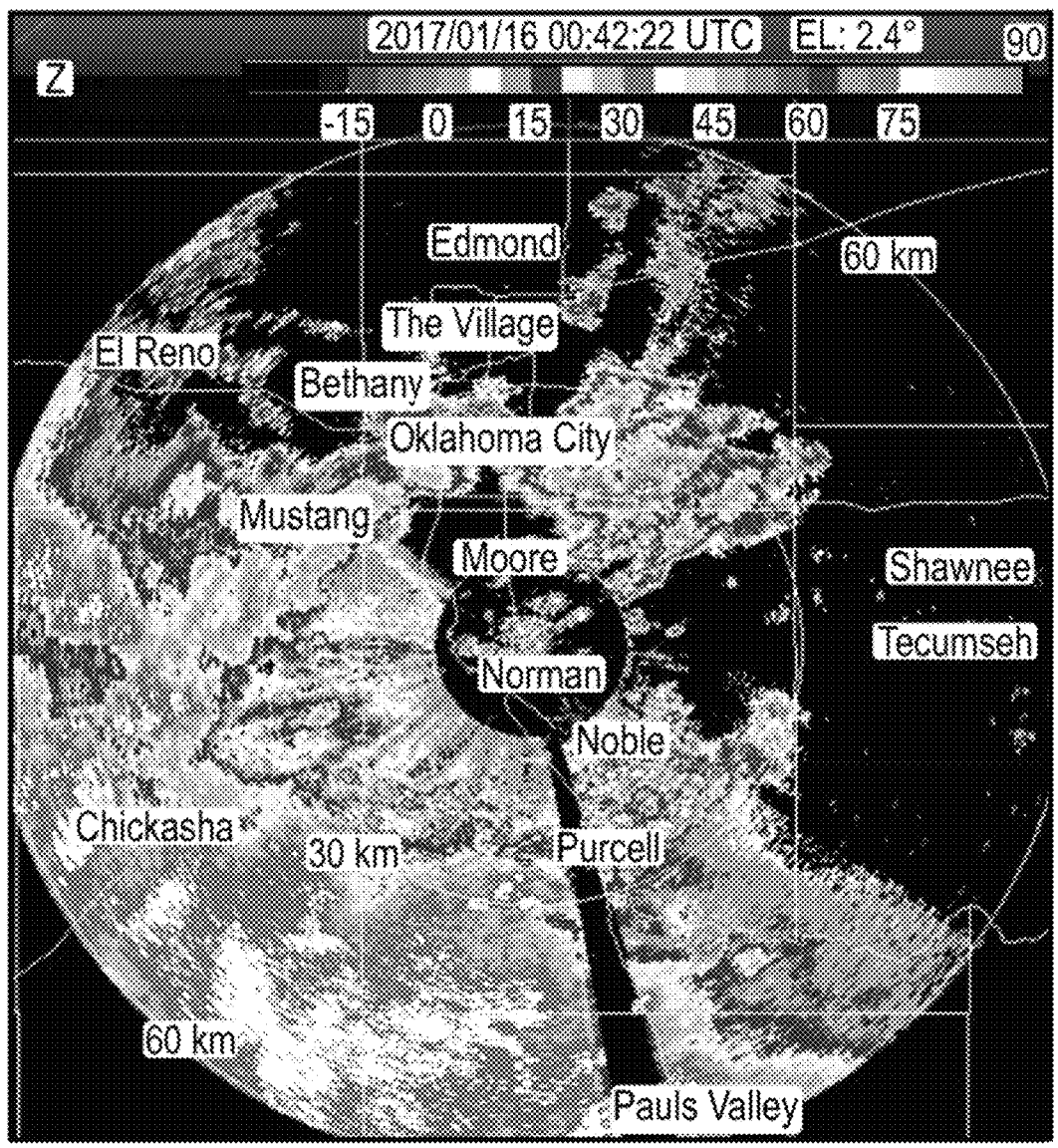
FIG. 1 shows an example of a reflectivity image with blind range filling using a short pulse time-frequency multiplexed (TFM) waveform where an abrupt sensitivity transition can be seen near the city of Moore, Okla. (from Cheong et al, 2013).

The present disclosure is directed to a novel signal processing method and apparatus for recovering the echoes inside the blind region without the use of fill pulse. This is accomplished through signal processing and using a technique based on partial decoding. Solid-state transmitters usually have a low transmit power and, to compensate for that, long pulses must be transmitted and processed using pulse compression, to maintain a good range resolution. However, when this long pulse is transmitted, the return signal is obscured during the time period in which the transmit pulse is transmitting; this is what is called the blind region. A shorter fill pulse is an option to recover the blind region; however, sensitivity is lower inside the blind region. On the other hand, this technique uses the basis of pulse compression to solve the problem.

As mentioned, due to the long transmit cycle, the radar receiver is simultaneously receiving echoes from the transmit signal, as well as interference from the broadcast of the transmit pulse. The interference from broadcasting the transmit pulse is referred to in the art as "leak through." It has been commonly believed that all targets within the range-time of the transmit cycle are not recoverable due to the much higher power of the leakage of the transmit power. Compared to return echoes from the targets, the transmit leakage, i.e. "leak through", is several orders of magnitude higher causing the radar to be blind in the near range. However, in accordance with the present disclosure, it has been determined that received samples from these targets are not completely obscured. Parts of the returned signals arrive beyond the range-time of the transmit cycle and, thus are unaffected, making the target recoverable by the radar system if only the good portion is used.

Before describing various embodiments of the present disclosure in more detail by way of exemplary description, examples, and results, it is to be understood that the embodiments of the present disclosure are not limited in application to the details of methods and apparatus as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that certain embodiments of the present disclosure can be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications, including but not limited to the provisional patent application identified by U.S. Ser. No. 62/798,287, mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the methods and apparatus of the embodiments of the present disclosure have been described in terms of particular embodiments, it will be apparent to those of skill in the art that variations may be applied thereto and in the steps or in the sequence of steps of the methods described herein without departing from the spirit and scope of the inventive concepts. All such similar substitutes and modifications apparent to those skilled in the art are deemed to be within the spirit and scope of the systems as defined herein.

As utilized in accordance with the methods and apparatus of the embodiments of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±0.5%, or ±1%, ±2%, or ±3%, or ±4%, or ±5%, ±6%, or ±7%, or ±8%, or ±9%, or ±10%, or ±11%, or ±12%, or ±13%, or ±14%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 80% of the time, or at least 90% of the time, or at least 95% of the time, or at least 98% of the time.

Features of any of the embodiments described herein may be combined with any of the other embodiments to create a new embodiment. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range. Reference to a series of ranges includes ranges which combine the values of the boundaries of different ranges within the series. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Thus, to further illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

The processes described in the present disclosure can be performed with the aid of a computer system running software adapted to perform the functions, and the resulting images and data are stored on one or more non-transitory computer readable mediums. Examples of a non-transitory computer readable medium include an optical storage device, a magnetic storage device, an electronic storage device or the like. The term "Computer System" as used herein means a system or systems that are able to embody and/or execute the logic of the processes described herein. The logic embodied in the form of software instructions or firmware may be executed on any appropriate hardware which may be a dedicated system or systems, or a specially programmed computer system, or distributed processing computer system. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the optical images, thermal images, RF information, or thereafter or combinations thereof.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), and application specific integrated circuit (ASIC), field programmable gate array (FPGA), a combination of hardware and software, and/or the like. The term "processor" as used herein means a single processor or multiple processors working independently or together to collectively perform a task.

Returning now to the description of the various embodiments of the present disclosure, consider a simple scenario in which a 10-km transmit waveform is used and there are two targets: one at 1 km and the other at 5 km. Typically, it would be assumed that the portion of the range up to 10 km is completely blind, so the radar cannot detect these two targets at 1 km or 5 km. However, it has been neglected that since the first target at 1 km would have a return signal that spans the range in between 1 km and 11 km, the last 1 km is good. Therefore, the return signal from the last 1-km portion can be used to identify the target at 1 km, although the return signal only has a tenth ($1/10$) of the return power left, since the signals from the first 10 km cannot be used. By a similar analysis, the target at 5 km would have half (50%) of its return signals arrive beyond 10 km. It can be seen that the completeness of a target return gradually increases as the range increases. Therefore, the new processing technique of the present disclosure produces radar products that have no blind region and the sensitivity function is continuous. As such, this technique does not suffer from the abrupt sensitivity change compared to the current state-of-the-art, such as the TFM implementation.

The presently disclosed technology can be applied to most solid-state pulse compression radars, and to various radar systems, including but not limited to, solid-state variants of polarimetric radars, wind profilers, and phased array radars. Improvements provided by the presently disclosed method and system over previously-used methods and systems include but are not limited to a necessity for less frequency spectrum and the absence of an abrupt sensitivity transition.

Figure 2A:
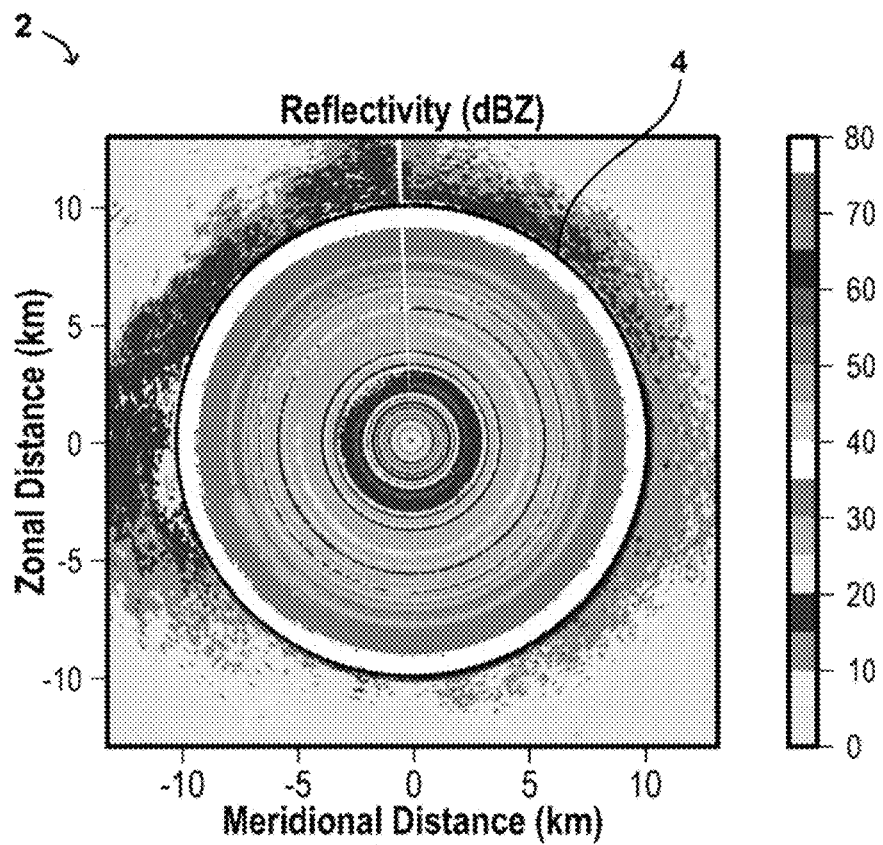
FIG. 2A shows a reflectivity image from a pulse compression radar showing a blind range region during the transmit cycle.
Figure 2B:
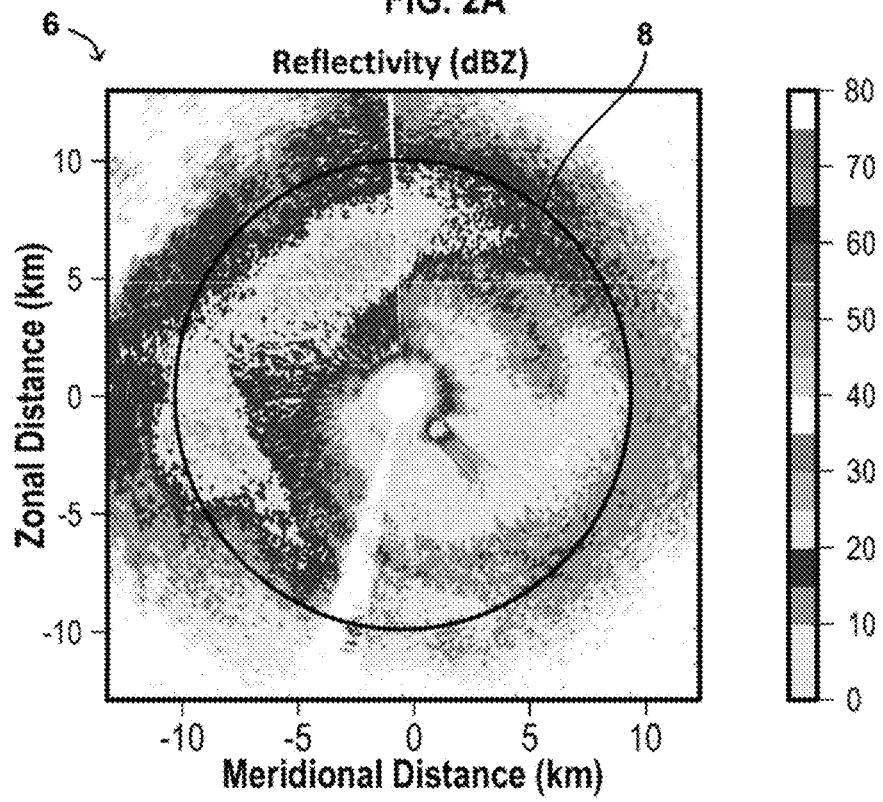
FIG. 2B shows reflectivity data within the blind range region that is recovered through partial decoding in accordance with the methods of the present disclosure.

FIG. 2A shows an example of a conventional reflectivity image from a pulse compression radar which includes a blind range during the transmit cycle. FIG. 2B, however, shows reflectivity data within the blind range that is recovered through partial decoding in accordance with the methods of the present disclosure.

Figure 3:
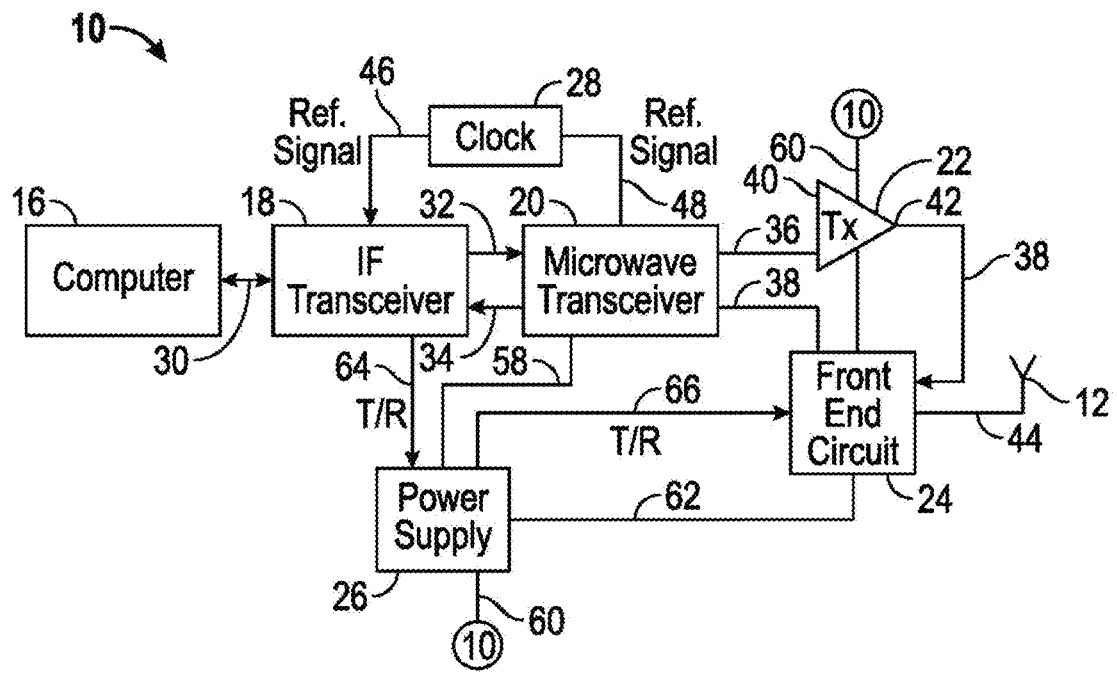
FIG. 3 is a block diagram of an exemplary radar system constructed in accordance with the present disclosure.

Referring now to FIG. 3, shown therein and designated by reference numeral 10 is a radar system constructed in accordance with the present disclosure. In particular, the radar system 10 may utilize a pulsed architecture, operate at an X-band frequency, and be designed and built for advanced solid-state weather radars. However, it should be understood that the radar system 10 can operate at different frequencies and be used for purposes other than weather radar. The radar system 10 may direct a transmit waveform to a radar antenna 12 and echoes from the transmit waveform may be received by the radar antenna 12 and converted into return signals. The front-end architecture may allow for the amplified transmit waveform in every pulse to be monitored in real time, demodulated from a carrier frequency and fed back to a computer system 16 and used as feedback to interpret the return signals that have also been demodulated from the carrier frequency as will be described further herein.

In one embodiment, the radar system 10 is provided with one or more computer system 16, one or more intermediate frequency transceiver 18 (hereinafter referred to as "IF transceiver 18"), one or more microwave transceiver 20 (hereinafter referred to as "microwave transceiver 20"), one or more radar amplifier 22 (hereinafter referred to as "radar amplifier 22"), one or more front-end circuit 24 (hereinafter referred to as "front-end circuit 24"), one or more power supply 26 (hereinafter referred to as "power supply 26") and one or more clock 28 (hereinafter referred to as "clock 28"). In accordance with the present disclosure, the radar amplifier 22 may have a relatively low power capacity compared to other radar amplifiers.

The computer system 16 is coupled to the IF transceiver 18 via a communication link 30 which may be in the form of a cable, for example to permit bidirectional communication between the computer system 16 and the IF transceiver 18. The IF transceiver 18 is coupled to the microwave transceiver 20 by communication links 32 and 34 to permit bidirectional communication therebetween. In particular, the IF transceiver 18 directs a transmit signal to the microwave transceiver 20 via the communication link 32 and the microwave transceiver 20 directs demodulated return signals to the IF transceiver 18 via the communication link 34. Although the communication links 32 and 34 are shown separately, it should be understood that the communication links 32 and 34 may be on a single physical communication link bundle. For example, communication links 32 and 34 can be one or more cables. The microwave transceiver 20 is coupled to the radar amplifier 22 via a communication link 36, which may be a cable, and is also coupled to the front-end circuitry 24 via a communication link 38. The radar amplifier 22 is provided with a low power side 40 configured to receive transmit signals from the communication link 36 and a high power side 42 configured to provide the amplified transmit waveform onto the communication link 38. The front end circuit 24 receives the amplified transmit waveform, and then directs the amplified transmit waveform to the radar antenna 12 via a communication link 44. The front end circuit 24 also directs the transmit signals to the microwave transceiver 20 via link 38 and subsequently IF transceiver 18 via link 34 to sample the transmit waveform. Otherwise, the front end circuit 24 directs the receive signal (low at 94, 96, and 98 in FIG. 3) from the antenna 12 to the microwave transceiver 20. The communication links 38 and 44 may be cable(s) or any other suitable electrical conductor(s).

The clock 28 is coupled to the IF transceiver 18 and the microwave transceiver 20 via communication links 46 and 48 and serves to provide reference signals for synchronizing the IF transceiver 18 and the microwave transceiver 20. The communication links 46 and 48 may be cables or any other suitable electrical conductor(s). The power supply 26 may provide power to the various components within the radar system 10 as well as various control signals as well. For example, as shown in FIG. 1, the power supply 26 supplies power to the microwave transceiver 20, the radar amplifier 22, and the front end circuit 24 via power lines 58, 60, and 62. Further, the power supply 26 is configured to receive a transmit/receive logic signal from the IF transceiver 18 via a communication link 64 and to direct the transmit/receive logic signal to the front end circuit 24 via a communication link 66.

Figure 4:
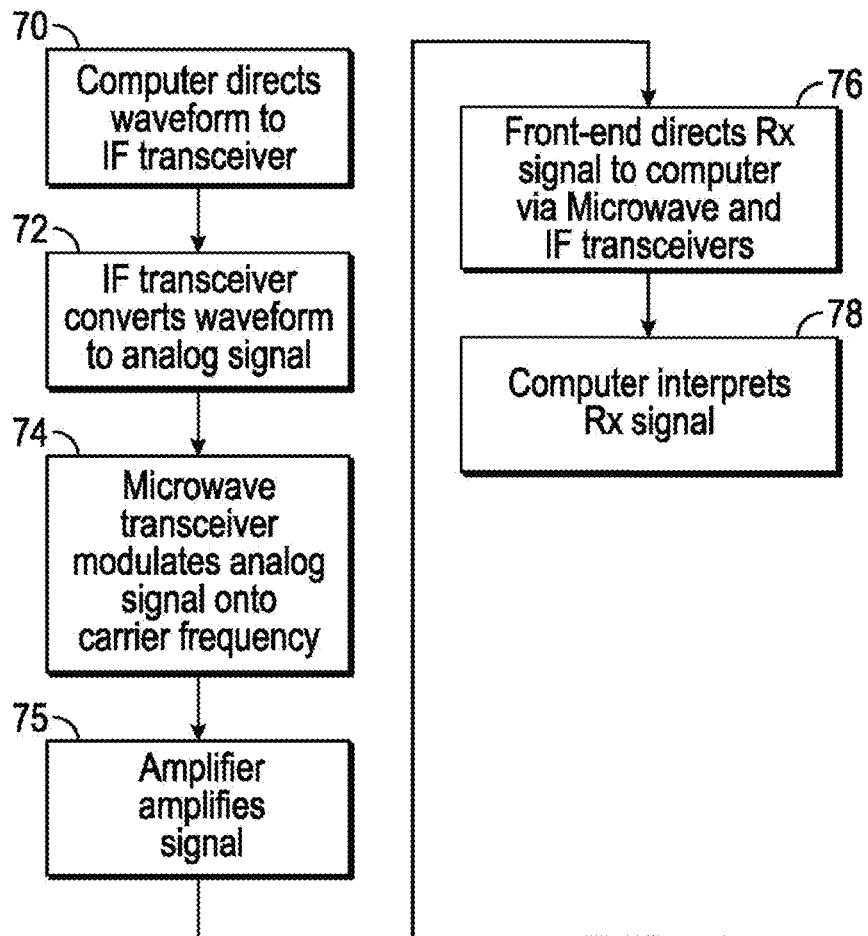
FIG. 4 is a logic flow diagram of sequential transmit and receive modes of the radar system depicted in FIG. 3.

Referring now to FIG. 4, shown therein is an exemplary logic flow diagram illustrating the functionality of the radar system 10 during a single pulse cycle. In general, prior to pulsing cycles, the transmit waveform are loaded to a wave table of the IF transceiver 20. At each pulse cycle, the transmit waveform is converted into analog forms as indicated by a block 72. In this example, the transmit pulse is in a digital format where the transmit waveform is implemented as a series of numbers which can be interpreted by a predetermined time sequence algorithm. The IF transceiver 18 receives the transmit pulse having the transmit waveform from the computer system 16 and then processes the transmit pulse with a predetermined time sequence algorithm to convert the series of numbers into an analog waveform as indicated by block 72. The IF transceiver 18 directs the analog waveform to the microwave transceiver 20 via the communication link 32, and also directs a transmit/receive signal to the power supply 26. The direction of the analog waveform and the transmit/receive signal is synchronized such that the amplified transmit waveform is sampled and fed back to the computer system 16 followed by the return signals as discussed above.

As indicated by the block 74, the microwave transceiver 20 receives the transmit signal in the form of the analog waveform and then modulates the analog waveform onto a carrier frequency to generate a transmit signal. The microwave transceiver 20 directs the transmit signal to the radar amplifier 22 via the communication link 36 as indicated by the block 75 whereby the radar amplifier 22 amplifies the transmit signal to form the amplified transmit waveform discussed above. The radar amplifier 22 may have any suitable gain and may operate in a nonlinear range, for example. Then, as indicated by block 76, the front end circuit 24 receives the amplified transmit waveform and the transmit/receive logic signal and then samples the amplified transmit waveform while also directing the amplified transmit waveform to the radar antenna 12 via the communication link 44. As indicated by the block 77, the sample of the amplified transmit waveform and the return signals are then directed to the computer system 16 by way of the communication links 38, 34, and 30 and the microwave transceiver 20 and the IF transceiver 18 where the sample of the amplified transmit waveform and the return signals are demodulated and converted from the analog form to a digital form. In other words, upon receipt of the sample of the amplified transmit waveform and the return signals, the microwave transceiver 20 demodulates the sample to remove the carrier frequency to form an analog waveform which is then converted into a digital waveform (i.e., series of numbers) by the IF transceiver 18.

Thereafter, as indicated by a block 78, the computer system 16 match filters the demodulated return signals with the demodulated sample of the amplified transmit waveform and then processes a radar signal having information generated by the match filtering of the demodulated return signals with the demodulated sample of the amplified transmit waveform with a radar processing algorithm as will be described further herein to convert the information into data such as meteorological data showing one or more features within the earth's atmosphere.

Figure 5:
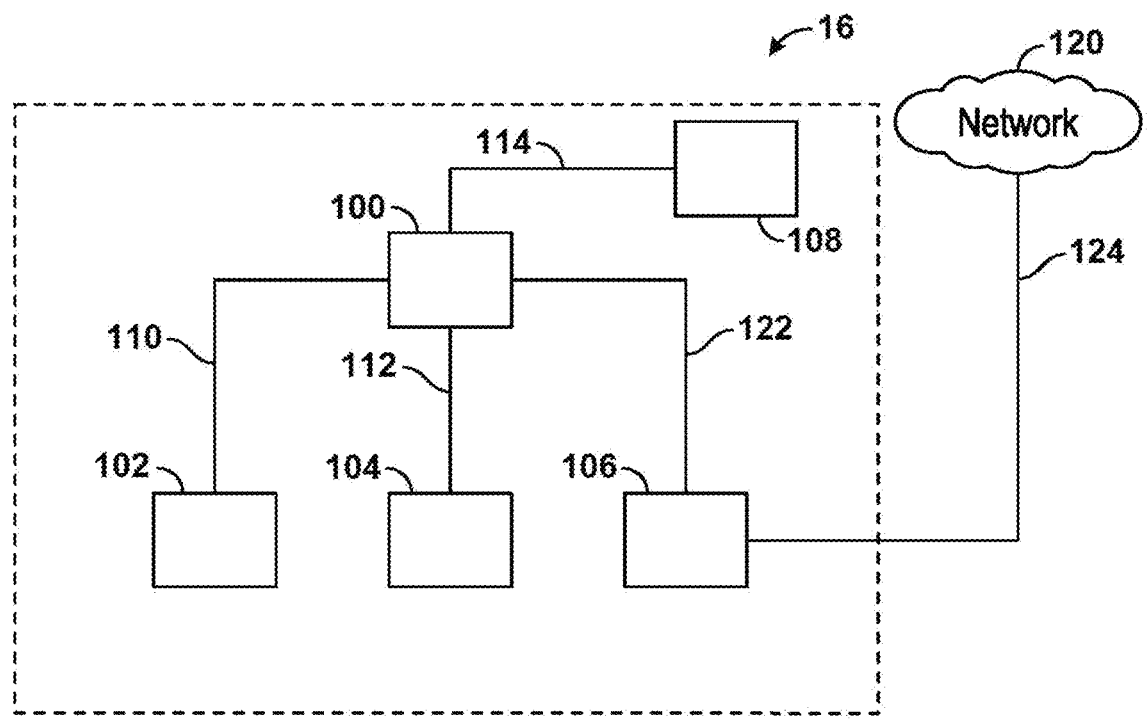
FIG. 5 is a block diagram of an exemplary computer system constructed in accordance with the present disclosure.

As shown in FIG. 5, the computer system 16 has a processor 100 which is configured to execute processor executable code, one or more memory 102 capable of storing processor executable code, an input device 104, and one or more communication interface 106, and an output device 108. The computer system 16 can be partially or completely network-based or cloud-based, and is not necessarily located in a single physical location.

The processor 100 can be implemented as a single or multiple processors working together to execute the logic described herein. Exemplary embodiments of the processor 100 include a digital signal processor (DSP), a central processing unit (CPU), a field programmable gate array (FPGA), a microprocessor, a multi-core processor, and combinations thereof. The processor 100 is capable of communicating with the one or more memories 102 via a path 110 which can be implemented as a data bus, for example. The processor 100 is capable of communicating with the input device 104 and the output device 108 via paths 112 and 114, respectively. Paths 112 and 114 may be implemented similarly to, or differently from, path 110. The processor 100 may be further capable of interfacing and/or communicating with one or more user terminals (not shown) via a network 420 via the one or more communication interface 106 and paths 122 and 124, such as by exchanging electronic, digital and/or optical signals via one or more physical or virtual ports using a network protocol such as TCP/IP, for example. It is to be understood that in certain embodiments when the processor 100 includes more than one processor, such processors may be located remotely from one another, located in the same location, or comprising a unitary multi-core processor (not shown). The processor 100 is capable of reading and/or executing processor executable code and/or of creating, manipulating, altering, and storing computer data structures into the one or more memory 102.

The one or more memory 102 stores processor executable code and may be implemented as non-transitory memory, such as random access memory (RAM), a CD-ROM, a hard drive, a solid state drive, a flash drive, a memory card, a DVD-ROM, a floppy disk, an optical drive, and combinations thereof, for example. It is to be understood that while one or more memory 102 is shown located in the same physical location as the computer system 16, the one or more memory 102 may be located remotely from the computer system 16 and may communicate with the processor 100 via the network 120. Additionally, when more than one memory 102 is used, one or more memory 102 may be located in the same physical location as the computer system 16, and one or more memory 102 may be located in a remote physical location from the computer system 16. The physical location(s) of the one or more memory 102 can be varied, and the one or more memory 102 may be implemented as a "cloud memory" i.e., one or more memory 102 which is partially, or completely based on, or accessed using the network 120.

The input device 104 transmits data to the processor 100, and can be implemented as a keyboard, a mouse, a touchscreen, a camera, a cellular phone, a tablet, a smart phone, a PDA, a microphone, a network adapter, and combinations thereof, for example. The input device 104 may be located in the same physical location as the computer system 16, or may be remotely located and/or partially or completely network-based. The input device 104 communicates with the processor 100 via the path 112 which, as discussed above may be a data bus.

The output device 108 transmits information from the processor 100 to a user, such that the information can be perceived by the user. For example, the output device 108 can be implemented as a server, a computer monitor, a cell phone, a tablet, a speaker, a website, a PDA, a fax, a printer, a projector, a laptop monitor, and combinations thereof. The output device 108 can be physically co-located with the computer system 16, or can be located remotely from the computer system 16, and may be partially or completely network based (e.g., a website hosted by one or more servers and accessible via the Internet using HTML, XHTML, secure HTML and/or TCP/IP, for example). The output device 108 communicates with the processor 100 via the path 114.

The network 120 preferably permits bi-directional communication of information and/or data between the computer system 16 and one or more user terminals and/or other devices (not shown). The network 120 may interface with the computer system 16 in a variety of ways, such as by optical and/or electronic interfaces, and may use a plurality of network topographies and protocols, such as Ethernet, TCP/IP, circuit switched paths, and combinations thereof, for example. For example, the network 120 can be implemented as the World Wide Web (or Internet), a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and combinations thereof, and may use a variety of network protocols to permit bi-directional interface and communication of data and/or information between the processor 100 and the network 120.

Figure 6:
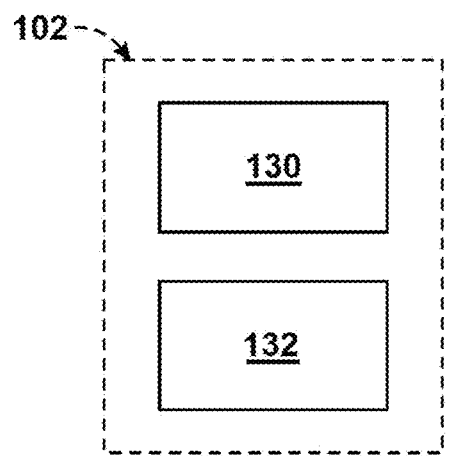
FIG. 6 is a block diagram of an exemplary memory of the computer system storing a transmit/receive algorithm and a radar processing algorithm in accordance with the present disclosure.

Referring now to FIG. 6, the one or more memory 102 may be referred to herein as a "non-transitory computer readable medium" and preferably stores processor executable code and/or information comprising the radar transmit/receive algorithm 130, and the radar processing algorithm 132. The processor executable code may be written in any suitable programming language, such as C++, for example. The radar transmit/receive algorithm 130, and the radar processing algorithm 132 can be stored as a data structure. In an alternative embodiment, the logic described above with respect to the processor 100, the radar transmit/receive algorithm 130, and the radar processing algorithm 113 may be executed by hardware such as an application specific integrated circuit or field programmable gate array.

Figure 7:
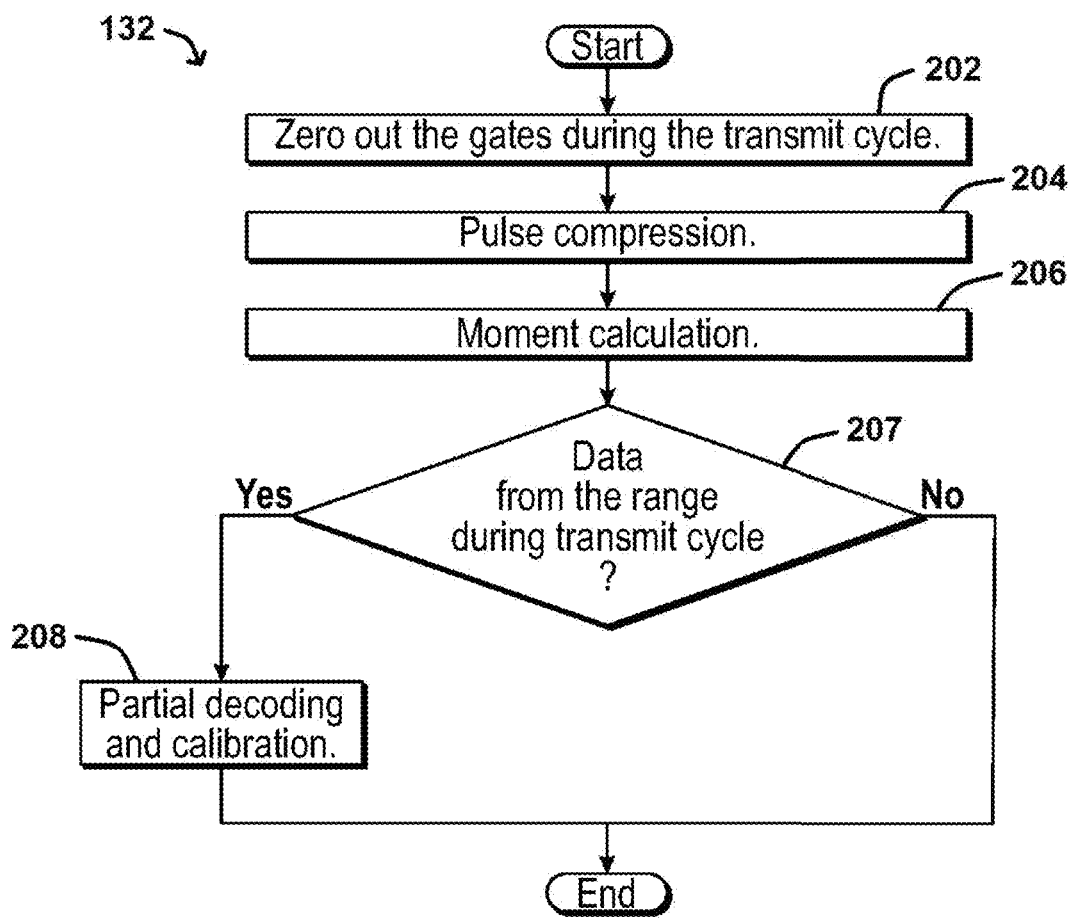
FIG. 7 is a flowchart showing steps of an embodiment of a partial decoding method of the present disclosure.

FIG. 7 is a flowchart showing a general sequence of steps for implementation of the radar processing algorithm 132 for blind range recovery of targets, as will be explained more fully below.

When the system 10 emits a transmission signal from the antenna 12, radio waves from the transmission signal reflect off an object and are returned to and received by the antenna 12. These reflected signals are referred to herein as a returned signal or returned waves. The system 10 may be provided with range gates (not shown) that open and close sequentially allowing returned signals to pass through each successive range gate within a given time period. The signals that pass through each gate are referred to as samples and represent a given range increment from the antenna 12. The transmission signal is emitted for a pre-determined amount of time which is often referred to as the pulse width. Depending on the frequency of the transmitted signal, radio waves transmitted at the beginning of the transmission signal will reach a certain distance from the antenna 12 before the end of the emitting of the transmission signal. For example, in FIGS. 2A and 2B circles 4 and 6, respectively, represent the distance the first radio waves which are transmitted from a transmitter, such as the antenna 12 of the radar system 10 located at the center of circles 4 and 6, reach before the transmission signal ends. The area inside circles 4 and 6 represent the so-called blind region referred to above. When discussed in terms of distance, the blind region may also be referred to as a blind range. In other words, for the exemplary waveforms represented in FIGS. 2A and 2B, the blind region is a circle having a radius of 10 kilometers or a blind range of 10 kilometers from the transmitter.

When radio waves from the transmitted signal reflect off an object inside the blind region, or before transmission of the transmission signal is completed, the reflected radio waves and the transmitted radio waves interfere with each other causing what is referred to in the art as "leakage" or "leak through" which is summed with the reflected signals and results in a combined signal that effectively cancels out the reflected signals. In an exemplary embodiment of the system 10, a returned signal is in-phase/quadrature (I/Q) and some of the returned signal samples are affected due to leakage from the transmission signal. As described herein, the system 10 removes portions of samples affected by leakage and compensates for the effect of the leakage in the radar processing algorithm 132 to produce a new compressed signal and moment products. To accomplish this, the radar processing algorithm 132 performs a process of partial decoding as described herein. A first step 202 in the partial decoding process is to eliminate the reflected signals, e.g., I/Q samples, affected by the transmit waveform leakage. This can be accomplished by discarding all return signals received during the transmit cycle which effectively zeroes out any signal returned from an object or interference caused by the transmission signal. The encoded input x(n) is modified, multiplying it by a window (w(n)) in order to suppress the leakage from the transmitted pulse, see FIG. 8 for a representation of the window. The encoded input x(n) may be a digital version of the return signal that is being processed by the computer system 16. The window w(n) is a function that serves to zero out return signals received during the transmission of the transmission signal. Then the new encoded input can be expressed as:

$$x'(n) = w(n) * x(n)$$

Where x'(n) is the new encoded input.

In a second step 204 of partial decoding, the new encoded input (e.g., uncompressed I/Q samples) is pulse compressed. This new encoded input, when passed through the decoder, will produce a different decoded output, but still uses the same template $x_t(\tau)$ for decoding. The new decoded output can be expressed as following:

$$y'(n) = \sum_\tau x'(\tau + n) x_t^*(\tau)$$

Then, in step 206, the new pulse compressed I/Q data is processed for moment products in a manner well known in the art. For example, in one non-limiting embodiment, moment products are calculated as they normally are in weather radars. This calculation has no difference to the ones used in conventional implementations.

In step 207, the radar processing algorithm 132 determines if there was data, i.e., signal returned from an object inside the blind range in the processed output. If there was no data in the processed output, the radar processing algorithm 132 ends and the processed output is used to perform radar product calculations.

Figure 8:
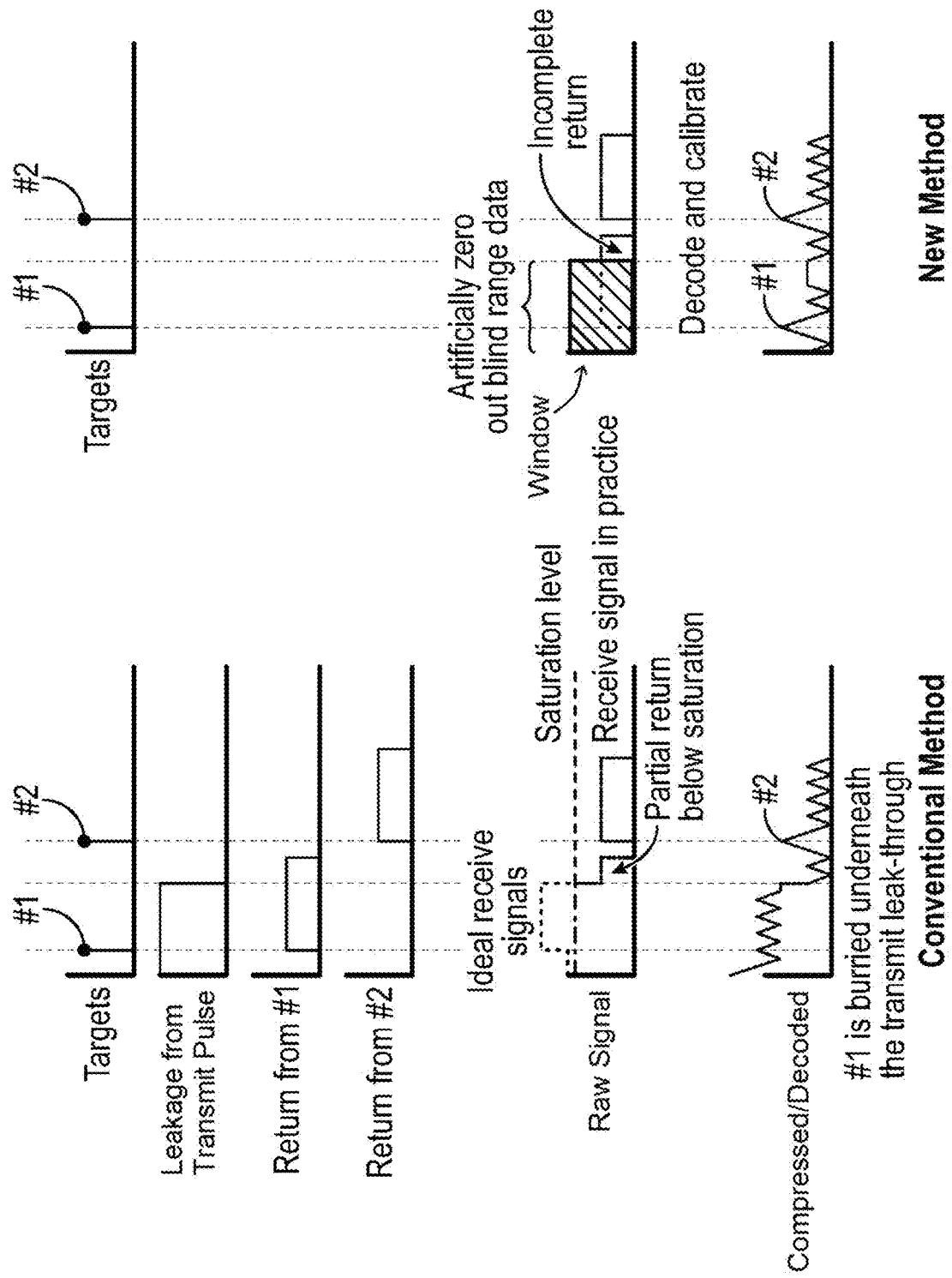
FIG. 8 illustrates a conceptual procedure of a blind range recovery method of the disclosure (righthand) in comparison to the conventional pulse compression method (lefthand). In processing using the conventional method, target #1 is undetected, i.e., buried underneath transmit leak-through. In processing using the presently disclosed method target #1 is now recovered.

However, if the radar processing algorithm 132 determines that there was data in the blind range in step 207, for instance finding an incomplete return as shown in FIG. 8, the processing algorithm 132 causes the computer 16 of the system 10 to perform partial decoding and calibration. Due to the window (zeroed-out section) at the beginning of the uncompressed I/Q received signal, returned signals from targets or objects within the blind range are only partially decoded and have a relatively small signal strength (i.e., on the order of ½ to ¹/₁₀ of the normal signal strength of a return signal. To properly detect the return signals from targets or objects within the blind range, it may be necessary to compensate for this effect. In step 208 the radar processing algorithm 132 applies a calibration or scaling factor as a weight multiplied to the calculated moment products from the radar in the processed output. The weight of the scaling factor depends on two factors, how close an affected range gate is to the transmitter, and what waveform is transmitted. An approximation of the scaling factor is presented in the following equation:

$$s(n) = \sqrt{\frac{\sum_i |x_t(i)|^2}{\sum_i |w(i) x_t(i)|^2}}$$

Where:
s(n) corresponds to the calibration factor;
$x_t$(i) corresponds to the template used for decoding; and
w(i) corresponds to the window multiplying the encoded input.

In some embodiments, the calibration factor s(n) may be applied prior to calculation of the moment products to form a dataset, and the moment products are then calculated using the dataset. For example, the calibration factor s(n) may be applied to the new encoded input x'(n). The calibration factor s(n) may only be applied to samples for range gates that receive during the transmit pulse or those suffering from partial decoding, for all other range gates the calibration factor is 1. Put another way, the only range gates that need calibration are those that have at least one zero I/Q sample for pulse compression, therefore, in general range gates outside the blind region do not need to be calibrated. Also, if the return signal, e.g., a compressed I/Q sample, is compressed from a set with many zeroes, then the calibration factor may be larger compared to a sample that was compressed from a set with almost no zeroes. By way of example, assume an ideal target which produces an identical received signal to the one transmitted, if the target is inside the blind region, and partial decoding is applied, the return signal will still be equal to the transmitted one but with some samples at the beginning affected by the partial decoding (replaced with zeros), this affects the compressed sample and the moments calculated from the compressed sample. That effect is mostly visible in the moment products as the reflectivity, where the value calculated is lower compared to the ideal target and even lower when coming closer to the radar antenna 12. This loss is proportional to the loss in power from the target due to the zeroed-out section when compared to the power from the same target if not affected by partial decoding. If this ratio of power is multiplied back to the calculated moments, the power will return to be what is expected. This concept is used to calculate the calibration factor, and since the calibration factor depends on the size of the section of the received signal affected by partial decoding (position in range), this calculation is performed individually for each range. To perform this calculation on the two exemplary targets shown in FIG. 8 there are necessarily three different waveforms, two from the two targets: one is a normalized received signal from the target number 2 which will not be affected by partial decoding (assumed to be the same as the normalized transmitted signal), and the other is a modified version of this received signal with a section that is artificially zeroed out by partial decoding (in the example shown in FIG. 8 approximately seventy five percent of the sample has been zeroed out but it should be noted that the portion affected changes depending on how much of the partially decoded signal falls in each range gate); as well as a copy of the normalized transmitted signal. The first step in calculating the calibration factor is to emulate pulse compression, the return signals from both versions of the target (affected and not affected by partial decoding) mentioned before are cross correlated to the transmitted waveform, also mentioned before, and the zero lag is saved for both cases. The second step is to calculate the ratio of powers, which is the weight used for calibration, the power may be calculated as the squared value of the zero-lag cross correlation from both the second target not affected by partial decoding and the first target that has been affected by partial decoding. The calibration factor is then the power from the second target divided by the power of the first target affected by partial decoding. This process is repeated for every gate range affected by partial decoding obtaining the different weight corresponding to each individual gate affected by partial decoding, for all other gates the weight multiplied is 1.

Once the processed output is multiplied by the scaling factor, the new decoded output can be written as:

$$y'(n) = s(n) \sum_{\tau} x'(\tau+n) x_t^*(\tau)$$

Where s(n) is the scaling factor. This scaling factor, can be derived from the previous expressions.

FIG. 8 illustrates a comparison of a conventional pulse compression method ("Conventional Method") and the novel blind range recovery method disclosed herein ("New Method"). This non-limiting example is based on two targets, one (target #2) located normally in the usable range and the other (target #1) located inside the blind region, which is the target of the blind range recovery of the present disclosure.

EXAMPLES

Several non-limiting experiments were conducted to demonstrate the efficacy of the new technique using various waveforms. During the experiments, a returned signal was processed using two techniques, conventional pulse compression and the new blind range recovery method, to evaluate the performance of both.

Figure 9A:
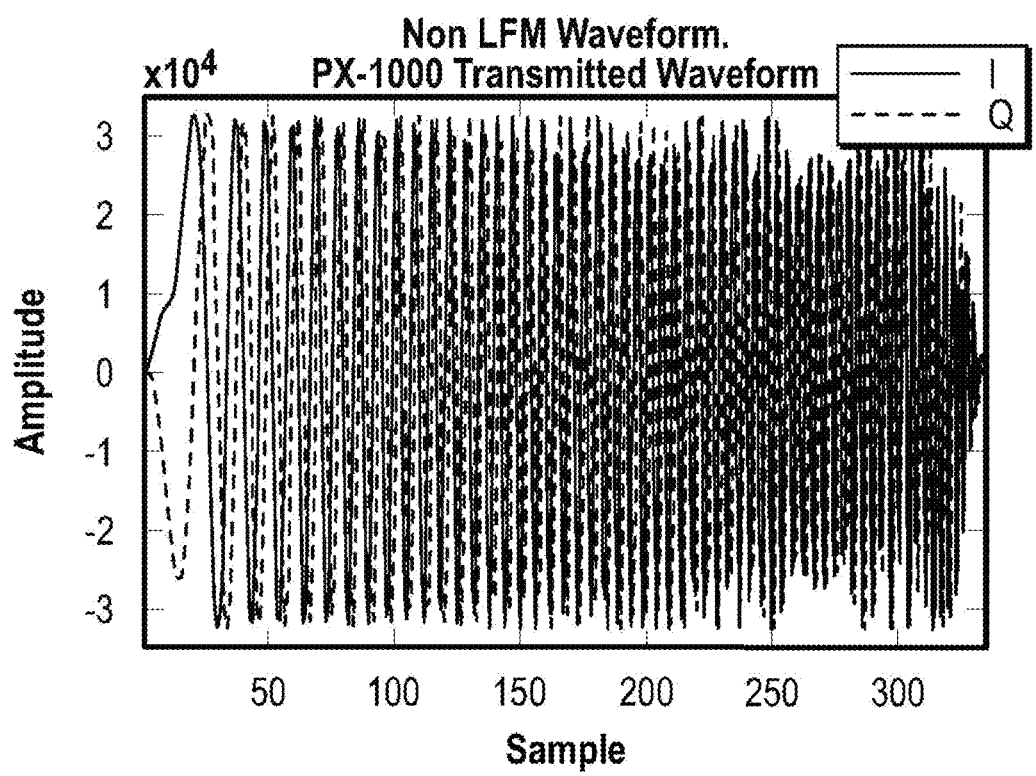
FIG. 9A shows a complex time-series of a Non-LFM waveform.
Figure 9B:
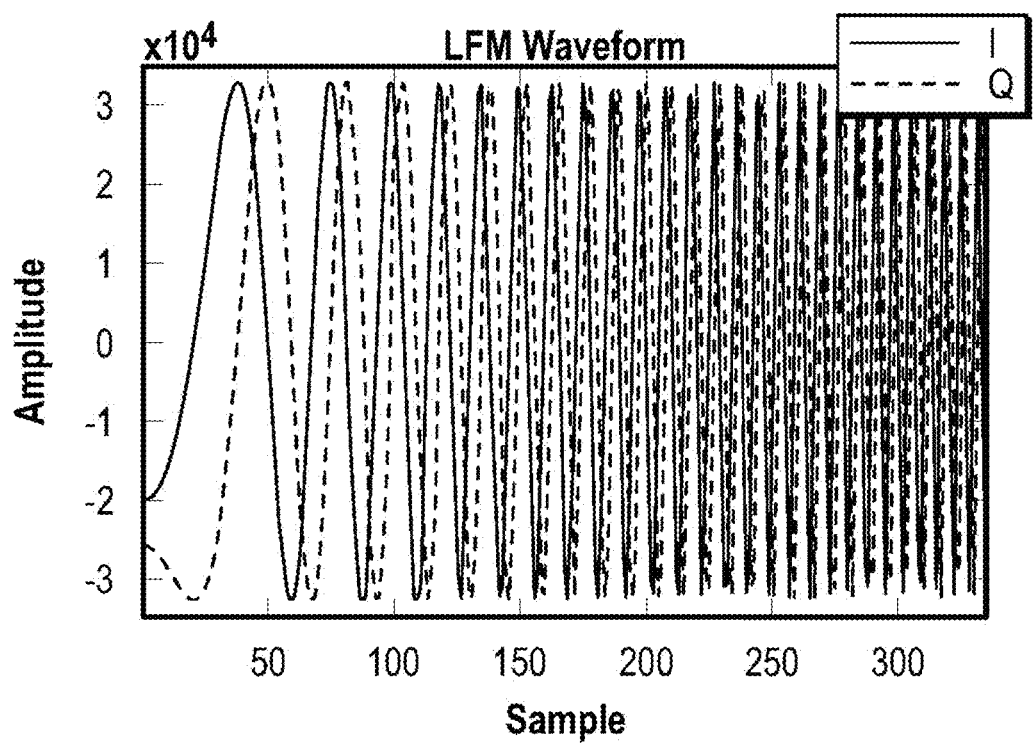
FIG. 9B shows a complex time-series of an LFM waveform.
Figure 9C:
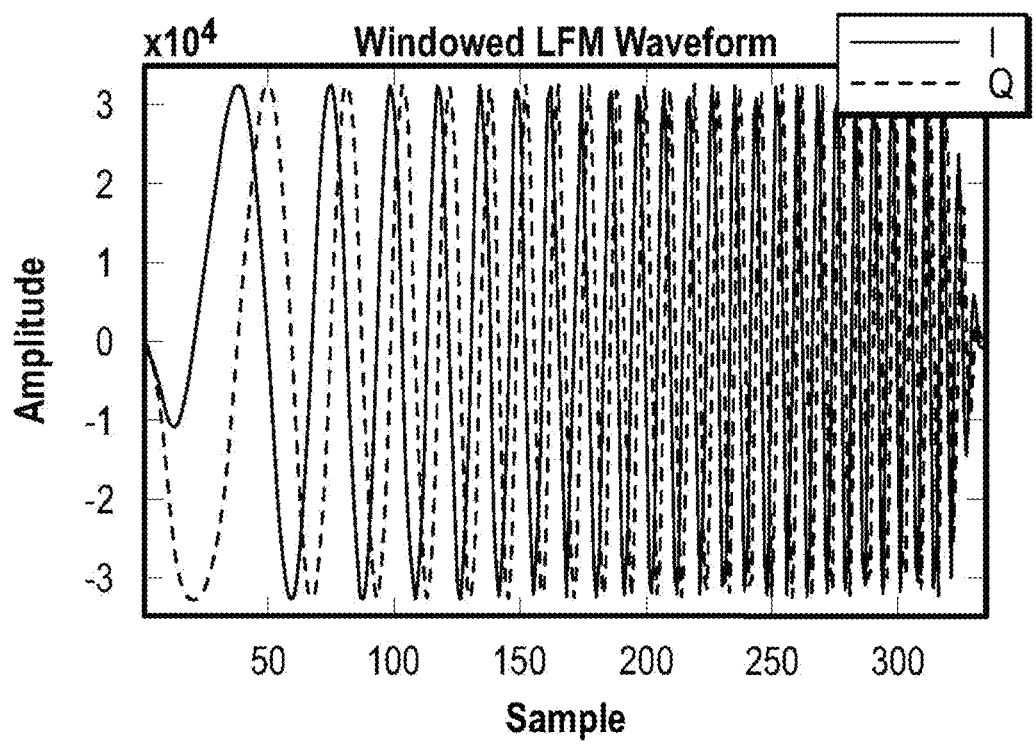
FIG. 9C shows a complex time-series of a Windowed LFM waveform.
Figure 9D:
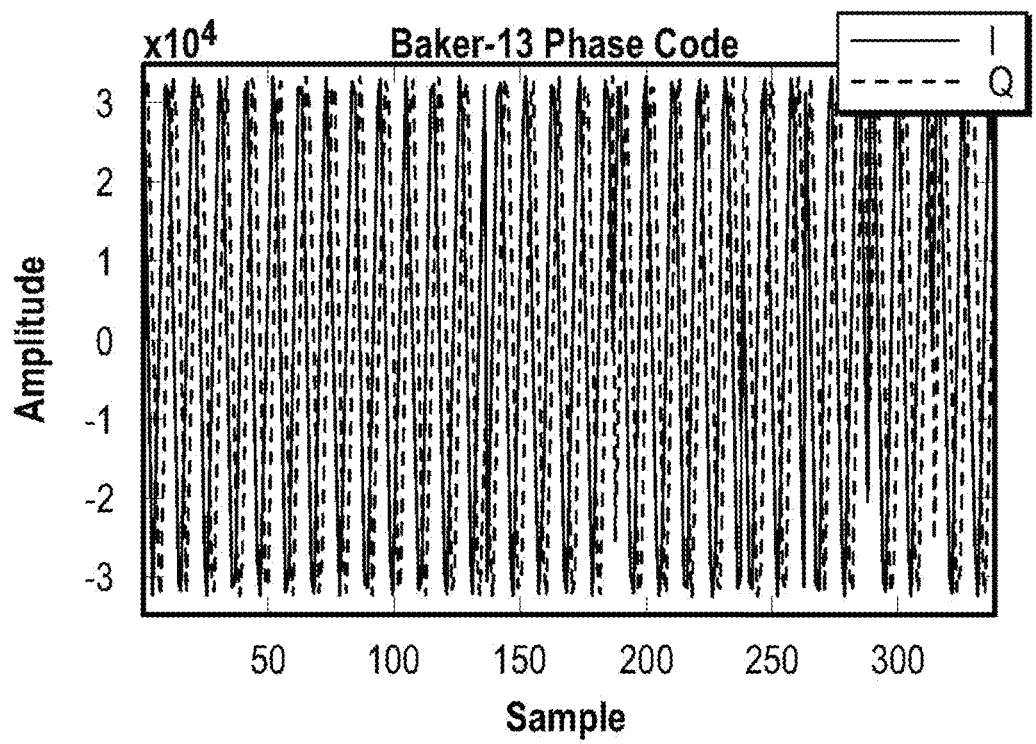
FIG. 9D shows a complex time-series of a Barker-13 Binary Phase Code waveform.
Figure 9E:
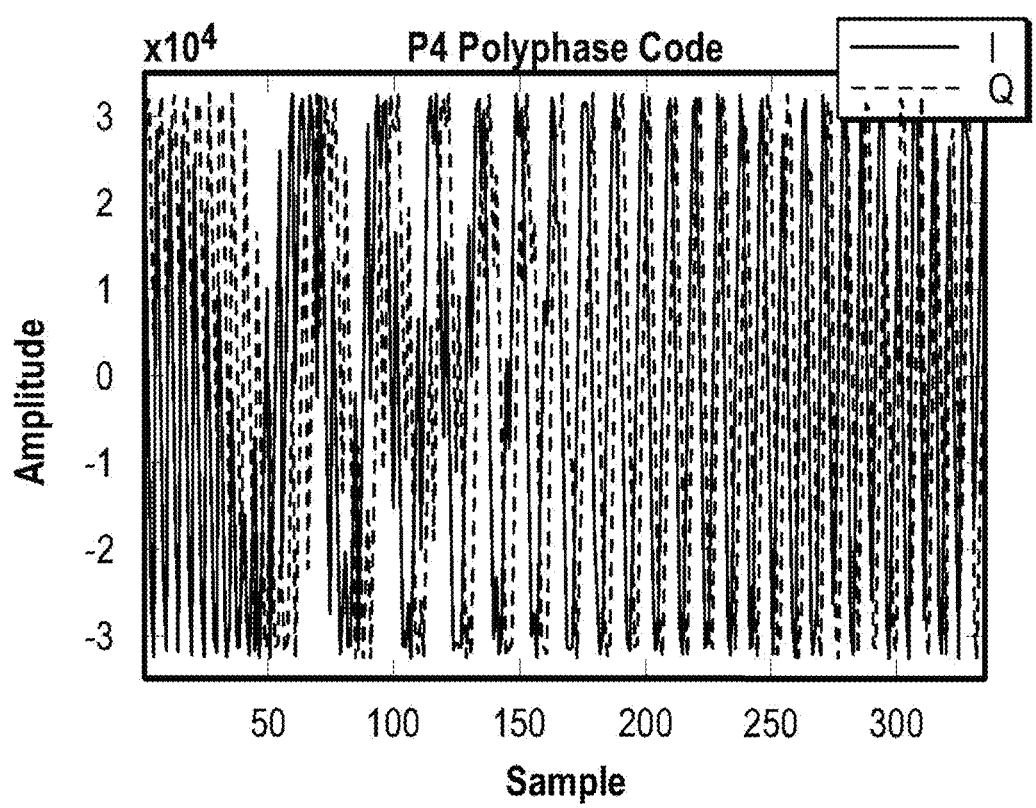
FIG. 9E shows a complex time-series of a P4 Polyphase Code waveform.
Figure 10A:
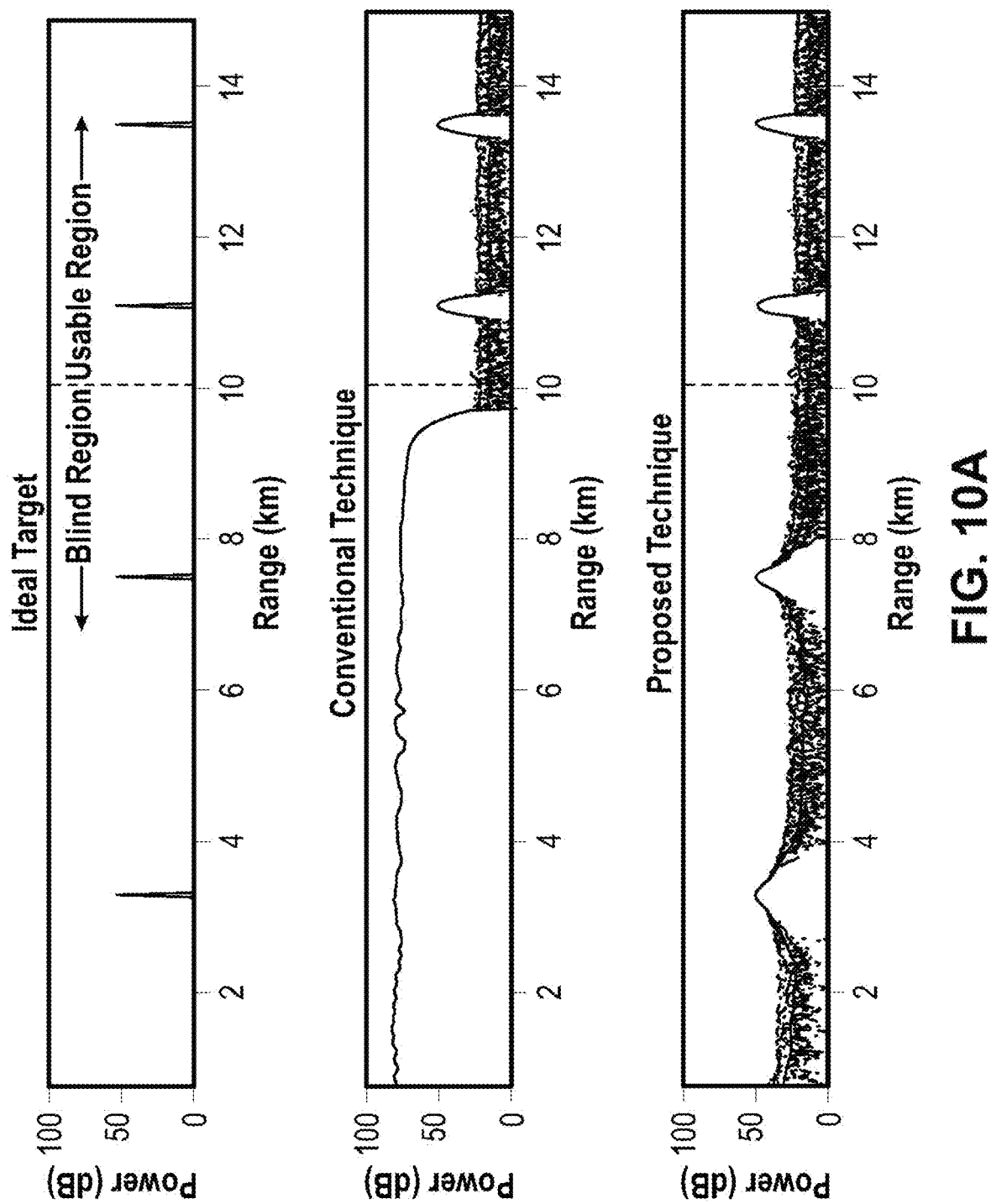
FIG. 10A shows results of a simulation of the presently disclosed method using a Non-LFM waveform. The upper panel utilizes Ideal targets. The center panel shows reflectivity from received signal using the Conventional pulse compression method. The lower panel shows reflectivity from received signal using the presently disclosed blind range recovery method.
Figure 10B:
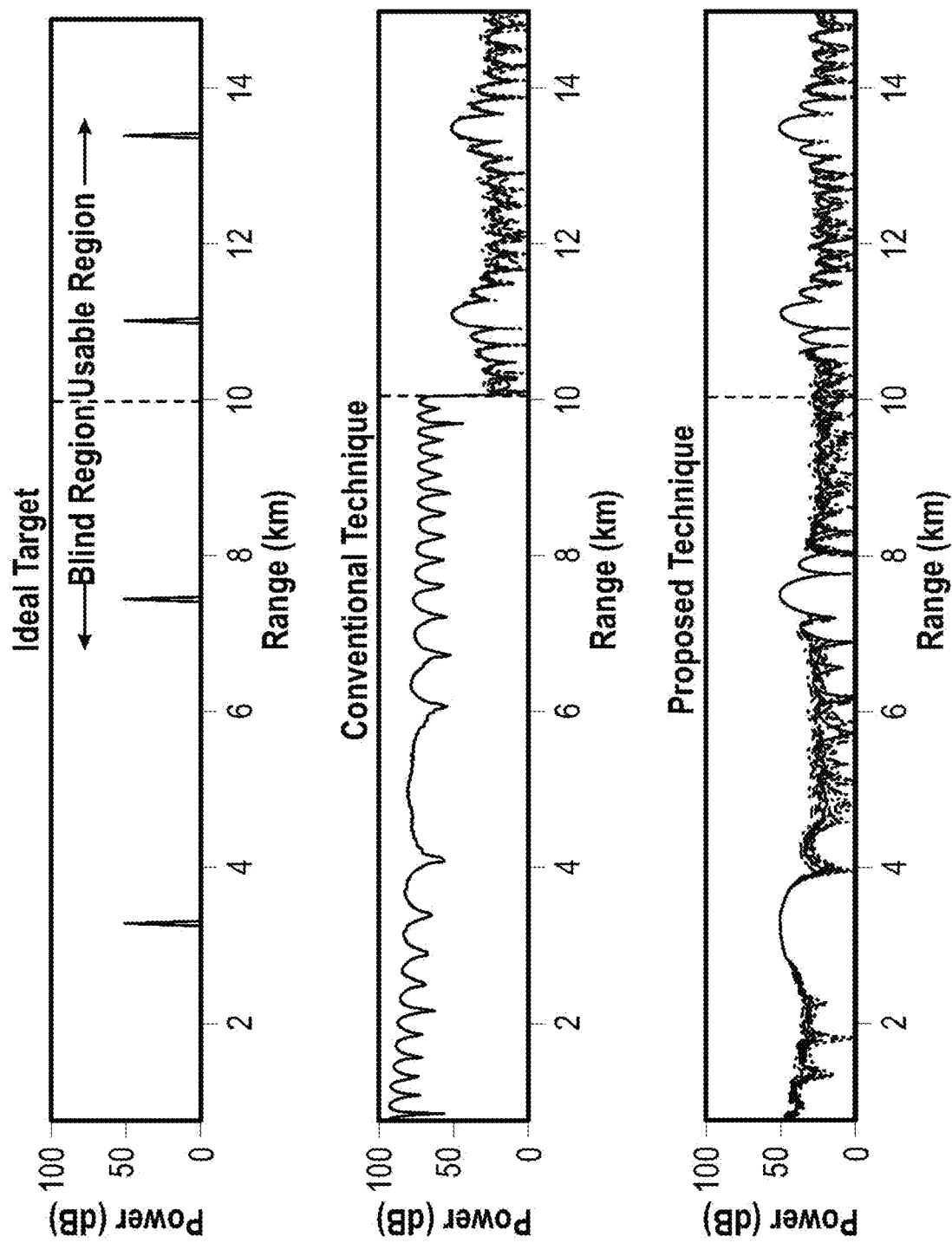
FIG. 10B shows results of a simulation of the presently disclosed method using an LFM waveform. The upper panel utilizes Ideal targets. The center panel shows reflectivity from received signal using the Conventional pulse compression method. The lower panel shows reflectivity from received signal using the presently disclosed blind range recovery method.
Figure 10C:
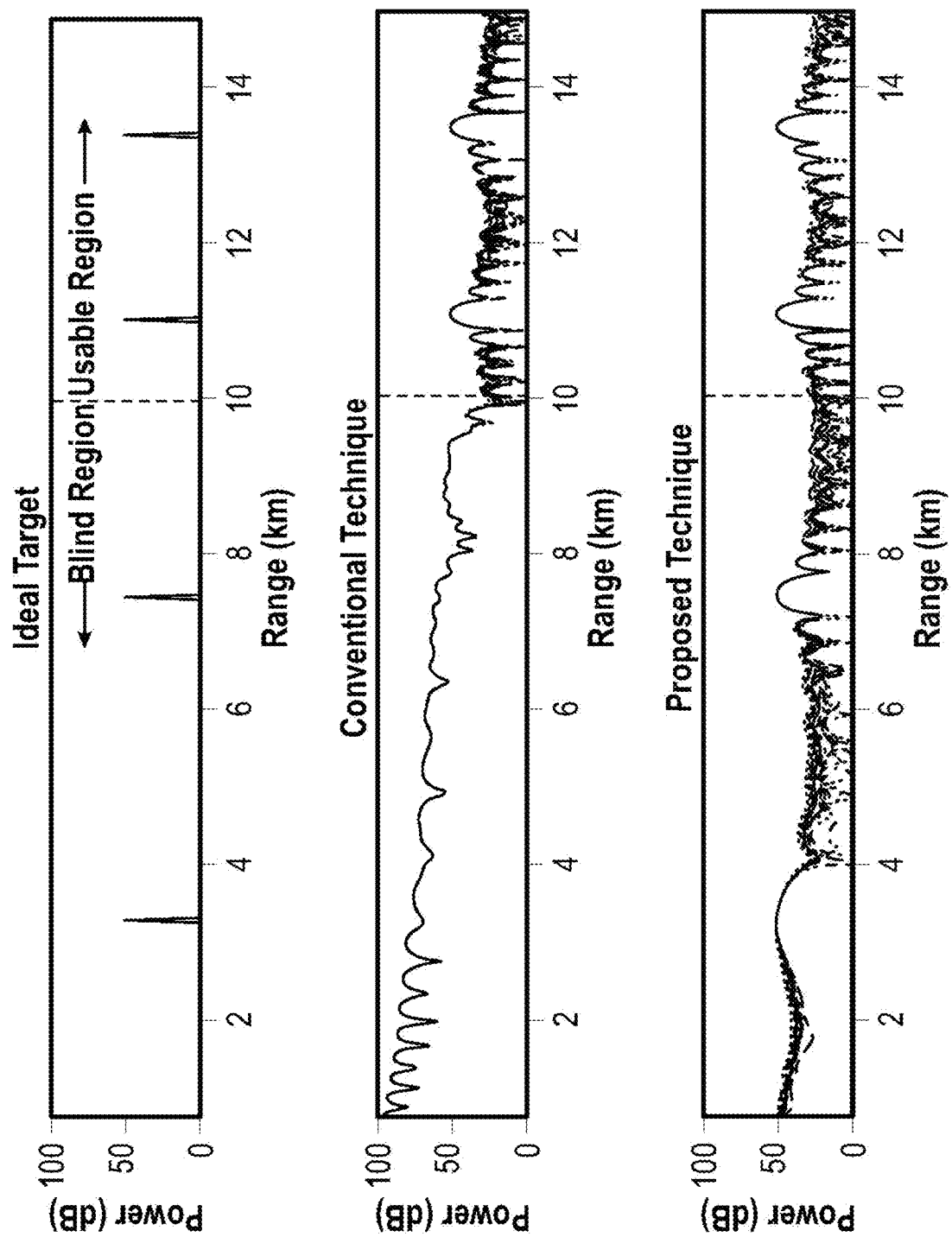
FIG. 10C shows results of a simulation of the presently disclosed method using Windowed LFM waveform. The upper panel utilizes Ideal targets. The center panel shows reflectivity from received signal using the Conventional pulse compression method. The lower panel shows reflectivity from received signal using the presently disclosed blind range recovery method.
Figure 10D:
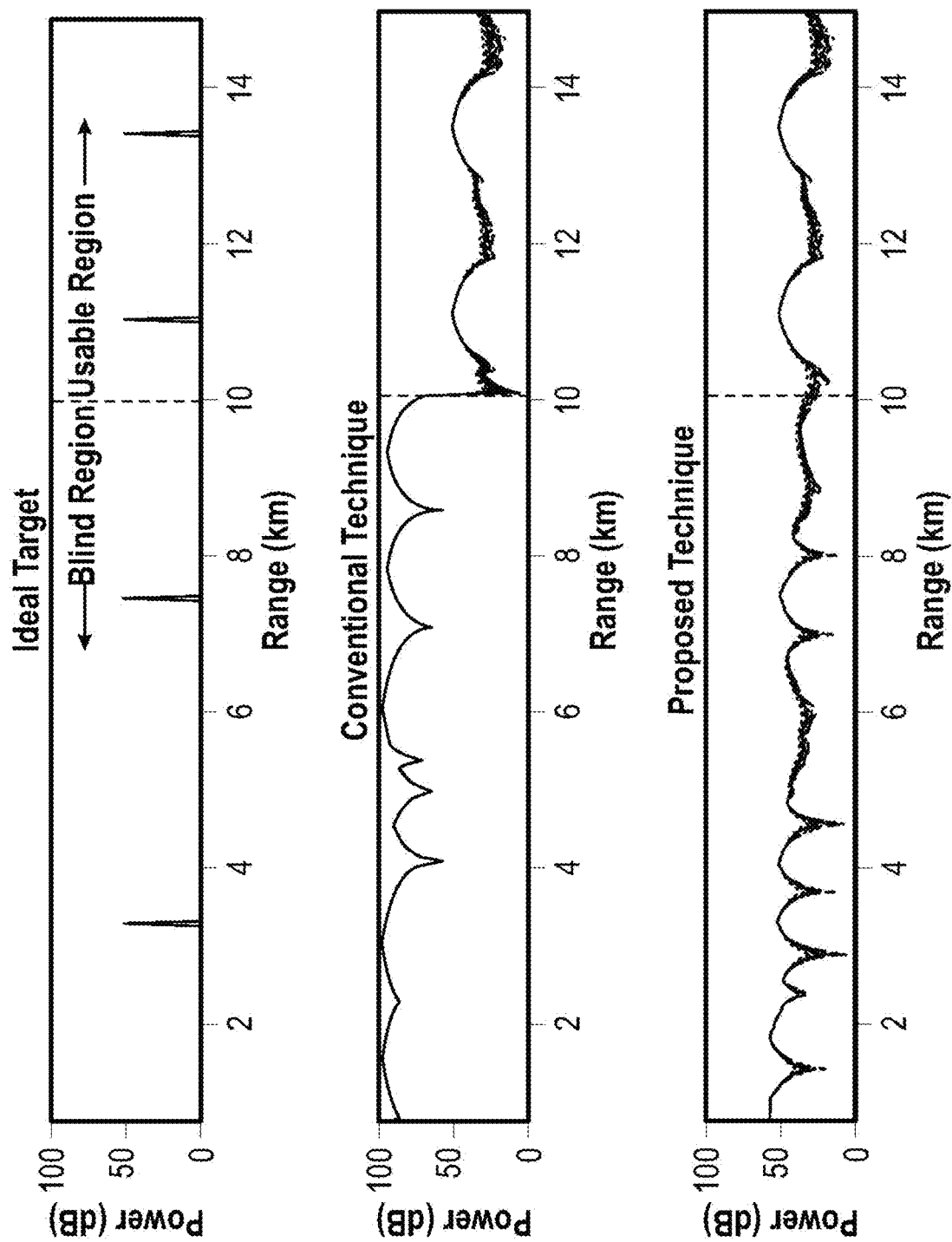
FIG. 10D shows results of a simulation of the presently disclosed method using a Barker-13 Binary Phase Code. The upper panel utilizes Ideal targets. The center panel shows reflectivity from received signal using the Conventional pulse compression method. The lower panel shows reflectivity from received signal using the presently disclosed blind range recovery method.
Figure 10E:
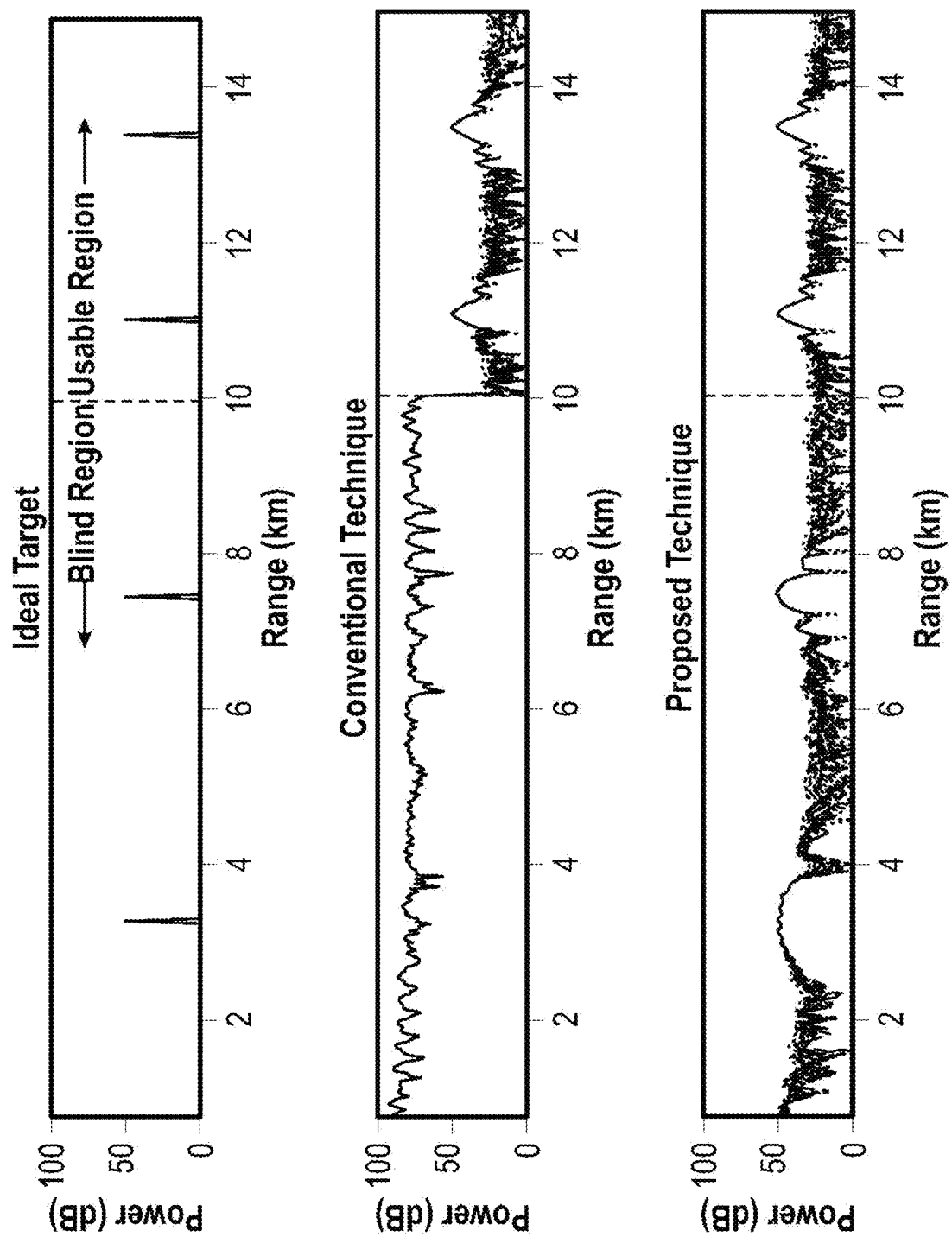
FIG. 10E shows results of a simulation of the presently disclosed method using a P4 Polyphase Code. The upper panel utilizes Ideal targets. The center panel shows reflectivity from received signal using the Conventional pulse compression method. The lower panel shows reflectivity from received signal using the presently disclosed blind range recovery method.

To perform the experiments, four targets were used, two located inside the blind range and two located outside the blind range. The transmitted waveforms included: a Non-Linear Frequency Modulation (Non-LFM) waveform shown in FIG. 9A, a Linear Frequency Modulation (LFM) waveform shown in FIG. 9B, Windowed LFM waveform shown in FIG. 9C, Barker-13 Binary Phase Code waveform shown in FIG. 9D, and P4 Polyphase Code waveform shown in FIG. 9E (e.g., see B. L. Lewis and F. F. Kretschmer J R., "Liner Frequency Modulation Derived Polyphase Pulse Compression Codes," *IEEE Trans. Aerosp. Electron. Syst.*, Vol. AES-18. NO. 5, pp 637-641, 1982). Simulations were conducted using each waveform. The ideal target response as well as the results in terms of reflectivity from both techniques are presented in FIGS. 10A-10E (corresponding to the waveforms shown in FIGS. 9A-9E, respectively). Though Phase Coded waveforms were implemented in the simulation, those are normally not used in radar applications and radar systems.

As illustrated by these results, targets inside the blind region are now visible using the methods and systems disclosed herein and are not obscured as in results obtained using the conventional method. It is notable that the targets within the blind region are not only recovered, but the reflectivity values from the targets are correct, even when it has been recovered from just a portion of the returned waveform. This has been achieved due to the inclusion of the calibration factor. Further, the targets are recovered in the correct range spot independently of the transmitted waveform.

In at least one embodiment, the present disclosure is directed to a method for processing radar signals to recover signals reflected by objects inside a blind region, comprising transmitting a transmission signal from a radar system; receiving, at the radar system, a return signal, the return signal including a portion of the transmission signal leaked during transmission and a portion reflected from the object inside the blind region; partially decoding the return signal by zeroing out the return signal received during transmission of the transmission signal to form a modified return signal; performing pulse compression of the modified return signal to form a compressed return signal; processing the compressed return signal to calculate moment products therefrom; and forming a dataset comprising data representing objects inside the blind region by calibrating the moment products of range gates that received return signals during a duration of the transmission signal with a calibration factor, wherein the calibration factor is proportional to a power loss due to effects of the partial decoding of the return signal received at a specific range gate, and wherein the calibration factor is based on a waveform of the transmission signal and on the proximity of the radar to a range covered by the specific range gate. The method may comprise the further step of generating an image based on the dataset, wherein the image includes targets in the blind range. The dataset may comprise weather data, and wherein the image is a weather image.

The following is a number list of non-limiting illustrative embodiments of the inventive concepts disclosed herein:

Clause 1. A method for processing radar signals to recover signals inside a blind region, comprising:
  transmitting a transmission signal from a radar system;
  receiving, at the radar system, a return signal, the return signal including a first portion of the transmission signal leaked during transmission and a second portion reflected from an object within the blind region;
  partially decoding the return signal by zeroing out a first portion of the transmission signal leaked during transmission of the transmission signal, forming a modified return signal, and performing pulse compression over the modified return signal to form a compressed return signal;
  processing the compressed return signal to calculate moment products therefrom; and
  forming a dataset comprising data recovered from the blind region by calibrating the moment products of range gates inside the blind range with a calibration factor, wherein the calibration factor is multiplied against only calculated moment products of range gates which have been partially decoded, wherein the calibration factor is proportional to a power loss due to effects of the partial decoding at a specific range gate, and wherein the calibration factor is based on a waveform of the transmission signal and on the proximity of the radar to a range covered by the specific range gate.

Clause 2. The method of clause 1, comprising the further step of generating an image based on the dataset, wherein the image includes targets in the blind range.

Clause 3. The method of clause 2, wherein the dataset comprises weather data, and the image is a weather image.

Clause 4. The method of any one of clauses 1-3, wherein the return signal is an I/Q signal.

Clause 5. A non-transitory computer readable medium storing computer executable logic that when executed by one or more processor cause the one or more processor to process radar signals to recover signals inside a blind region by:
  receiving a return signal from a radar system, the return signal including a first portion of a transmission signal leaked during transmission and a second portion reflected from an object within the blind region;
  partially decoding the return signal by zeroing out the first portion of the transmission signal leaked during transmission of the transmission signal, forming a modified return signal, and performing pulse compression over the modified return signal to form a compressed return signal;
  processing the compressed return signal to calculate moment products therefrom; and
  forming a dataset comprising data recovered from the blind region by calibrating the moment products of range gates inside the blind range with a calibration factor, wherein the calibration factor is multiplied against only calculated moment products of range gates which have been partially decoded, wherein the calibration factor is proportional to a power loss due to effects of the partial decoding at a specific range gate, and wherein the calibration factor is based on a waveform of the transmission signal and on the proximity of the radar to a range covered by the specific range gate.

Clause 6. The non-transitory computer readable medium of clause 5, wherein the computer executable logic that when executed by the one or more processor cause the one or more processor to generate an image based on the dataset, wherein the image includes targets in the blind range.

Clause 7. The non-transitory computer readable medium of clause 6, wherein the dataset comprises weather data, and the image is a weather image.

Clause 8. The non-transitory computer readable medium of any one of clauses 5-7, wherein the return signal is an I/Q signal.

Clause 9. A computer system, comprising:
  one or more processor:
    receiving a return signal from a radar system, the return signal including a first portion of a transmission signal leaked during transmission and a second portion reflected from an object within the blind region;
    partially decoding the return signal by zeroing out first portion of the transmission signal leaked during transmission of the transmission signal, forming a modified return signal, and performing pulse compression over the modified return signal to form a compressed return signal;
    processing the compressed return signal to calculate moment products therefrom; and
    forming a dataset comprising data recovered from the blind region by calibrating the moment products of range gates inside the blind range with a calibration factor, wherein the calibration factor is multiplied against only calculated moment products of range gates which have been partially decoded, wherein the calibration factor is proportional to a power loss due to effects of the partial decoding at a specific range gate, and wherein the calibration factor is based on a waveform of the transmission signal and on the proximity of the radar to a range covered by the specific range gate.

Clause 10. The computer system of clause 9, wherein the one or more processor generates an image based on the dataset, wherein the image includes targets in the blind range.

Clause 11. The computer system of clause 10, wherein the dataset comprises weather data, and the image is a weather image.

Clause 12. The computer system of any one of clauses 9-11, wherein the return signal is an I/Q signal.

Clause 13. A computer system, comprising:
  one or more processor:
    receiving a return signal from a radar system, the return signal including a first portion of a transmission signal leaked during transmission and a second portion reflected from an object within a blind region;
    partially decoding the return signal by zeroing out first portion of the transmission signal leaked during transmission of the transmission signal, forming a modified return signal, calibrating the modified return signal with one or more calibration factor to form a calibrated modified return signal, and performing pulse compression over the calibrated modified return signal to form a compressed return signal;

processing the compressed return signal to calculate moment products therefrom; and wherein calibrating the modified return signal with the one or more calibration factor forms a dataset.

Clause 14. The computer system of clause 13, wherein the calibration factor is multiplied against only the modified return signal of range gates which have been partially decoded, wherein the calibration factor is proportional to a power loss due to effects of the partial decoding at a specific range gate, and wherein the calibration factor is based on a waveform of the transmission signal and on the proximity of the radar to a range covered by the specific range gate.

Clause 15. The computer system of clause 13, wherein the one or more processor generates an image based on the dataset, wherein the image includes targets in the blind range.

Clause 16. The computer system of clause 15, wherein the dataset comprises weather data, and the image is a weather image.

Clause 17. The computer system of any one of clauses 13, 14, 15 or 16, wherein the return signal is an I/Q signal.

Clause 18. A method, comprising:
receiving a return signal from a radar system, the return signal including a first portion of a transmission signal leaked during transmission and a second portion reflected from an object within a blind region;

partially decoding the return signal by zeroing out first portion of the transmission signal leaked during transmission of the transmission signal, forming a modified return signal, and performing pulse compression over the modified return signal to form a compressed return signal;

processing the compressed return signal to calculate moment products therefrom; and wherein a calibration factor is applied to at least one of the modified return signal, the compressed return signal, and the moment products to form a dataset comprising data recovered from the blind region.

Clause 19. A non-transitory computer readable medium storing computer executable code that when executed by a processor cause the processor to perform the method of clause 18.

Clause 20. A computer system comprising one or more processor performing the method of clause 18.

While several embodiments have been provided in the present disclosure, it will be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope of the inventive concepts disclosed herein.

What is claimed is:

1. A method for processing radar signals to recover signals inside a blind region, comprising:
transmitting a radar signal from a radar system;
receiving, at the radar system, a return signal reflected from an object within the blind region, the return signal including a first portion obscured due to a leakage from a transmission of the radar signal and a second portion unaffected by the leakage from the transmission of the radar signal;

partially decoding the return signal by zeroing out the first portion obscured due to the leakage from the transmission of the radar signal, forming a modified return signal, and performing a pulse compression over the modified return signal to form a compressed return signal;

processing the compressed return signal to calculate moment products therefrom; and forming a dataset comprising data recovered from the blind region by calibrating the moment products of range gates inside the blind region with a calibration factor, wherein the calibration factor is multiplied against only calculated moment products of the range gates which have been partially decoded, wherein the calibration factor is proportional to a power loss due to effects of the partial decoding at a specific range gate, and wherein the calibration factor is based on a waveform of the radar signal and on a proximity of the radar system to the specific range gate.

2. The method of claim 1, further comprising the step of generating an image based on the dataset, wherein the image includes targets in the blind region.

3. The method of claim 2, wherein the dataset comprises weather data, and the image is a weather image.

4. The method of claim 1, wherein the return signal is an I/O signal.

5. A non-transitory computer readable medium storing a computer executable logic that when executed by one or more processor cause the one or more processor to process radar signals to recover signals inside a blind region by:

receiving, from a radar system, a return signal reflected from an object within the blind region, the return signal including a first portion obscured due to a leakage from transmission of the radar signal and a second portion unaffected by the leakage from the transmission of the radar signal;

partially decoding the return signal by zeroing out the first portion obscured due to the leakage from the transmission of the radar signal, forming a modified return signal, and performing a pulse compression over the modified return signal to form a compressed return signal;

processing the compressed return signal to calculate moment products therefrom; and forming a dataset comprising data recovered from the blind region by calibrating the moment products of range gates inside the blind region with a calibration factor, wherein the calibration factor is multiplied against only calculated moment products of the range gates which have been partially decoded, wherein the calibration factor is proportional to a power loss due to effects of the partial decoding at a specific range gate, and wherein the calibration factor is based on a waveform of the radar signal and on a proximity of the radar system to the specific range gate.

6. The non-transitory computer readable medium of claim 5, wherein the computer executable logic that when executed by the one or more processor cause the one or more processor to generate an image based on the dataset, wherein the image includes targets in the blind region.

7. The non-transitory computer readable medium of claim 6, wherein the dataset comprises weather data, and the image is a weather image.

8. The non-transitory computer readable medium of claim 5, wherein the return signal is an I/O signal.

9. A computer system, comprising:
one or more processor:
receiving, from a radar system, a return signal reflected from an object within the blind region, the return signal including a first portion obscured due to a leakage from a transmission and a second portion unaffected by the leakage from the transmission of the radar signal;
partially decoding the return signal by zeroing out the first portion obscured due to the leakage from the transmission of the transmission radar signal, forming a modified return signal, and performing a pulse compression over the modified return signal to form a compressed return signal;
processing the compressed return signal to calculate moment products therefrom; and
forming a dataset comprising data recovered from the blind region by calibrating the moment products of range gates inside the blind region with a calibration factor, wherein the calibration factor is multiplied against only calculated moment products of the range gates which have been partially decoded, wherein the calibration factor is proportional to a power loss due to effects of the partial decoding at a specific range gate, and wherein the calibration factor is based on a waveform of the radar signal and on the proximity of the radar system to the specific range gate.

10. The computer system of claim 9, wherein the one or more processor generates an image based on the dataset, wherein the image includes targets in the blind region.

11. The computer system of claim 10, wherein the dataset comprises weather data, and the image is a weather image.

12. The computer system of claim 9, wherein the return signal is an I/Q signal.

13. A computer system, comprising:
one or more processor:
receiving, from a radar system, a return signal reflected from an object within a blind region, the return signal including a first portion obscured due to a leakage from a transmission of the radar signal and a second portion unaffected by the leakage from the transmission of the radar signal;
partially decoding the return signal by zeroing out the first portion obscured due to a leakage from the transmission of the radar signal, forming a modified return signal, calibrating the modified return signal with one or more calibration factor to form a calibrated modified return signal, and performing a pulse compression over the calibrated modified return signal to form a compressed return signal;
processing the compressed return signal to calculate moment products therefrom; and
wherein calibrating the modified return signal with the one or more calibration factor forms a dataset and wherein the return signal is an I/Q signal.

14. The computer system of claim 13, wherein the calibration factor is multiplied against only the modified return signal of range gates which have been partially decoded, wherein the calibration factor is proportional to a power loss due to effects of the partial decoding at a specific range gate, and wherein the calibration factor is based on a waveform of the radar signal and on a proximity of the radar system to the specific range gate.

15. The computer system of claim 13, wherein the one or more processor generates an image based on the dataset, wherein the image includes targets in the blind region.

16. The computer system of claim 15, wherein the dataset comprises weather data, and the image is a weather image.

* * * * *

UNITED STATES PATENT AND TRADEMARK OFFICE
CERTIFICATE OF CORRECTION

PATENT NO. : 11,313,959 B2
APPLICATION NO. : 16/765429
DATED : April 26, 2022
INVENTOR(S) : Cesar M. Salazar Aquino, Robert D. Palmer and Boon Leng Cheong It is certified that error appears in the above-identified patent and that said Letters Patent is hereby corrected as shown below:

In the Claims

Column 18, Line 40 in Claim 4: Delete "I/O" and replace with -- I/Q --

Column 19, Line 12 in Claim 8: Delete "I/O" and replace with -- I/Q --

Column 19, Line 21 in Claim 9: Before "radar signal;" delete "the" and replace with -- a --

Column 19, Line 24 in Claim 9: After "transmission of the" delete "transmission"

Signed and Sealed this
Twentieth Day of December, 2022

Katherine Kelly Vidal
*Director of the United States Patent and Trademark Office*